United States Patent
Howard et al.

(10) Patent No.: US 11,715,958 B2
(45) Date of Patent: Aug. 1, 2023

(54) SYSTEM AND METHOD FOR POWER CONTROL OF AN INVERTER-BASED RESOURCE WITH A GRID-FORMING CONVERTER

(71) Applicant: General Electric Company, Schenectady, NY (US)

(72) Inventors: Dustin Howard, Atlanta, GA (US); Alfredo Sebastian Achilles, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 76 days.

(21) Appl. No.: 17/388,189

(22) Filed: Jul. 29, 2021

(65) Prior Publication Data

US 2023/0031575 A1  Feb. 2, 2023

(51) Int. Cl.
*H02J 3/38* (2006.01)
*F03D 7/02* (2006.01)
*H02J 3/46* (2006.01)

(52) U.S. Cl.
CPC ............ *H02J 3/381* (2013.01); *F03D 7/0284* (2013.01); *H02J 3/46* (2013.01); *H02J 2300/28* (2020.01)

(58) Field of Classification Search
CPC .......... H02J 3/381; H02J 3/46; H02J 2300/28; F03D 7/0284
See application file for complete search history.

(56) References Cited

U.S. PATENT DOCUMENTS 5,798,633 A    8/1998  Larsen et al.
7,119,452 B2  10/2006  Larsen
(Continued)

FOREIGN PATENT DOCUMENTS

| CN | 107482684 A | * 12/2017 | ............... H02J 3/38 |
| CN | 109245639 A | *  1/2019 | ............... H02J 3/24 |
| CN | 109494709 A |    3/2019 | |
| CN | 110323763 A | * 10/2019 | ............... H02J 3/24 |

(Continued)

OTHER PUBLICATIONS

Miller et al., Design and Commissioning of a 5 MVA, 2.5 MWh Battery Energy Storage System, Proceedings of 1996 Transmission and Distribution Conference and Exposition, Los Angeles CA, 1996, pp. 339-345. https://doi.org/10.1109/TDC_1996.545957.
The EP Search Report for EP application No. 22182612.6., dated Jan. 26, 2023, 8 pages.

*Primary Examiner* — Harry R Behm
(74) *Attorney, Agent, or Firm* — Dority & Manning, P.A.

(57) ABSTRACT

A method for controlling an inverter-based resource (IBR) having a power converter connected to an electrical grid includes receiving a first power limit signal for the IBR from an external controller, receiving a second power limit signal for the IBR, and determining a constrained power limit signal based on the first and second power limit signals. The method also includes applying a first frequency droop function to the constrained power limit signal and determining at least one of a power reference signal or a pitch reference signal for the IBR as a function of an output of the first frequency droop function and the constrained power limit signal. Further, the method includes determining one or more control commands for the IBR based on at least one of the power reference signal or the pitch reference signal and controlling the IBR based on the control command(s) so as to support a grid frequency of the electrical grid within power available at the IBR.

20 Claims, 14 Drawing Sheets

(56) References Cited

U.S. PATENT DOCUMENTS

| | | | |
|---|---|---|---|
| 7,456,695 B2 | 11/2008 | Weng et al. | |
| 7,804,184 B2 | 9/2010 | Yuan et al. | |
| 8,994,200 B2 * | 3/2015 | Thisted | F03D 9/255 |
| | | | 290/55 |
| 9,270,194 B2 | 2/2016 | Brogan et al. | |
| 9,660,452 B2 | 5/2017 | Routimo | |
| 9,660,453 B2 | 5/2017 | Majumder | |
| 10,156,225 B2 | 12/2018 | Huang et al. | |
| 11,552,476 B1 * | 1/2023 | Achilles | H02J 3/381 |
| 2009/0200803 A1 | 8/2009 | Ichinose et al. | |
| 2009/0278351 A1 | 11/2009 | Rivas et al. | |
| 2010/0114397 A1 * | 5/2010 | Cardinal | H02J 13/00034 |
| | | | 700/297 |
| 2010/0142237 A1 | 6/2010 | Yuan et al. | |
| 2014/0307488 A1 | 10/2014 | Brogan et al. | |
| 2015/0214754 A1 * | 7/2015 | Choi | H02J 7/0069 |
| | | | 320/134 |
| 2016/0306372 A1 * | 10/2016 | Holveck | G05F 1/625 |
| 2021/0281079 A1 * | 9/2021 | Valcan | H02J 3/48 |

FOREIGN PATENT DOCUMENTS

| | | |
|---|---|---|
| EP | 2523298 B1 | 11/2012 |
| EP | 3116085 A1 | 1/2017 |
| EP | 3116087 A1 | 1/2017 |
| WO | WO2015131958 A1 | 9/2015 |
| WO | WO 2021/145877 A1 | 7/2021 |

\* cited by examiner

SYSTEM AND METHOD FOR POWER CONTROL OF AN INVERTER-BASED RESOURCE WITH A GRID-FORMING CONVERTER

FIELD

The present disclosure relates generally to inverter-based resources, such as wind turbine power systems and more particularly, to systems and methods for power control of an inverter-based resource with a grid-forming converter.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to an electrical grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

In addition, the reduction in the proportion of synchronous machines with respect to inverter-based resources, which determine the grid defining parameters voltage and frequency, have contributed to decreasing stability margins. The immediate consequence of the decreased stability margins is a grid collapse when subjected to voltage and frequency disturbances in the grid.

Accordingly, many existing inverter-based resources, such as doubly-fed wind turbine generators, operate in a "grid-following" mode. Grid-following type devices utilize fast current-regulation loops to control active and reactive power exchanged with the grid. Thus, turbine-controls with grid-following converters are designed to inject maximum power available from the wind, independent of generation/load balance in the grid. More specifically, FIG. 1 illustrates the basic elements of the main circuit and converter control structure for a grid-following doubly-fed wind turbine generator. As shown, the active power reference to the converter is developed by the energy source regulator, e.g., the turbine control portion of a wind turbine. This is conveyed as a torque reference which represents the lesser of the maximum attainable power from the energy source at that instant, or a curtailment command from a higher-level grid controller. The converter control then determines a current reference for the active component of current to achieve the desired torque. Accordingly, the doubly-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming type converters provide a voltage-source characteristic, where the angle and magnitude of the voltage are controlled to achieve the regulation functions needed by the grid. Thus, grid-forming converters participate in generation-load balance in a similar way as conventional generators based on synchronous machines. Therefore, wind turbines with grid-forming converter controls requires the turbine controls to manage both the power output from available wind together with the power demands of the grid. With this structure, current will flow according to the demands of the grid while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Double-Feb Wind Turbine Generator."

As an example, FIG. 2 illustrates a schematic diagram of one embodiment of a main circuit of a grid-forming system. As shown, the main circuit includes a power-electronic converter with connections on DC and AC sides. This converter receives gating commands from a controller that creates an AC voltage phasor Vcnv at an angle of Thvcnv.

The angle is with respect to a reference phasor having a fixed frequency. The DC side is supplied with a device capable of generating or absorbing power for even a short duration. Such devices may include, for example, batteries, solar panels, rotating machines with a rectifier, or capacitors. In addition, as shown, the circuit includes an inductive impedance Xcnv connecting the converter to its point of interconnection, shown as the voltage Vt and angle ThVt in FIG. 2. The electrical system behind the point of interconnect is shown as a Thevenin equivalent with impedance Zthev and voltage Vthev at angle ThVthev. This equivalent can be used to represent any circuit, including grid-connected and islanded circuits with loads. In practical situations, the impedance Zthev will be primarily inductive.

Still referring to FIG. 2, the closed-loop portion of the main control receives feedback signals from the voltage and current at the point of interconnection. Additional inputs are received from higher-level controls (not shown). While FIG. 2 illustrates a single converter as an example, any grouping of equipment that can create an electrical equivalent of a controlled voltage Vcnv behind an impedance Xcnv can have the control schemes disclosed applied to achieve the same performance benefits.

Referring now to FIG. 3, a control diagram for providing grid-forming control according to conventional construction is illustrated. As shown, a converter controller 1 receives references (e.g., Vref and Pref) and limits (e.g., VcmdLimits and PcmdLimits) from higher-level controls 2. These high-level limits are on physical quantities of voltage, current, and power. The main regulators include a fast voltage regulator 3 and a slow power regulator 4. These regulators 3, 4 have final limits applied to the converter control commands for voltage magnitude (e.g., VcnvCmd) and angle (e.g., $\theta_{Pang}$ and $\theta_{PLL}$) to implement constraints on reactive- and real-components of current, respectively. Further, such limits are based upon a pre-determined fixed value as a default, with closed-loop control to reduce the limits should current exceed limits.

Accordingly, the present disclosure is directed to systems and methods for controlling an inverter-based resource that is responsive to grid frequency excursions, while also allowing for maximizing power generation when grid-frequency conditions are normal.

BRIEF DESCRIPTION

Aspects and advantages of the invention will be set forth in part in the following description, or may be obvious from the description, or may be learned through practice of the invention.

In one aspect, the present disclosure is directed to a method for controlling an inverter-based resource having a power converter connected to an electrical grid. The method includes receiving, via a controller, a first power limit signal for the inverter-based resource from an external controller. The method also includes receiving, via a local power constraint module of the controller, a second power limit signal for the inverter-based resource. Further, the method includes determining, via the controller, a constrained power limit signal based on the first and second power limit signals. Moreover, the method includes applying, via the controller, a first frequency droop function to the constrained power limit signal. The method also includes determining, via a maximum power tracking algorithm of the controller, at least one of a power reference signal or a pitch reference signal for the inverter-based resource as a function of an output of the first frequency droop function and the constrained power limit signal. In addition, the method includes determining, via the controller, one or more control commands for the inverter-based resource based on at least one of the power reference signal or the pitch reference signal. As such, the method includes controlling, via the controller, the inverter-based resource based on the one or more control commands so as to support a grid frequency of the electrical grid within power available at the inverter-based resource.

In an embodiment, the method may also include adjusting, via the controller, the power reference signal using a second frequency droop function before determining the one or more control commands.

In another embodiment, a frequency reference for at least one of the first and second frequency droop functions is a filtered version of a frequency feedback of the inverter-based resource. In such embodiments, a filter bandwidth of the first frequency droop function is higher than a filter bandwidth of the second frequency droop function.

In further embodiments, the inverter-based resource includes a wind turbine power system having at least one generator. In such embodiments, the one or more control commands include at least one of a power signal for a converter controller of the power converter or a pitch command for a pitch system of the wind turbine power system.

In several embodiments, the controller is a turbine controller or a converter controller of the wind turbine power system.

In additional embodiments, the method may include determining, via the local power constraint module of the controller, the second power limit signal for the inverter-based resource by determining, via the controller, a compensation for the power reference signal to account for frequency droop operation, determining, via the controller, a compensated output power reference signal based on the power reference signal, and determining a final compensated power reference based on the compensation for the power reference signal and the compensated output power reference signal.

In such embodiments, determining the compensation for the power reference signal to account for frequency droop operation may include receiving, via the controller, a frequency grid reference signal and a frequency grid feedback signal from the electrical grid, determining a difference between the frequency grid reference signal and the frequency grid feedback signal, and applying, via the controller, a second frequency droop function to the difference to determine the compensation for the power reference signal.

In further embodiments, determining the compensation for the power reference signal to account for frequency droop operation may include compensating, via a first filtered differential element of the controller, an output of the second frequency droop function to determine the compensated output power reference signal.

In yet another embodiment, determining the compensated output power reference signal based on the power reference signal may include filtering, via the controller, the power reference signal and compensating, via a second filtered differential element of the controller, the filtered power reference signal to determine the compensated output power reference signal.

In additional embodiments, the method may include applying a margin offset to the final compensated power reference.

In still further embodiments, the method may include generating, via the controller, a frequency reference signal based on the frequency grid feedback signal from the electrical grid, and sending, via the controller, the frequency reference signal to a converter controller of the power converter. In such embodiments, the frequency reference signal drives a converter droop to zero during steady state and the power setpoint limit constrains the power setpoint closer to actual power being generated by the inverter-based resource, thereby allowing the first frequency droop function to respond to power demands from the electrical grid.

In particular embodiments, generating the frequency reference signal may include filtering, via one or more filters of the controller, the frequency grid feedback signal from the electrical grid. In such embodiments, the one or more filters may include at least one of a first-order low-pass filter or a rolling-average low-pass filter.

In one aspect, the present disclosure is directed to a system for controlling a wind turbine power system having a grid-forming power converter connected to an electrical grid. The system includes a turbine controller comprising at least one processor, the at least one processor configured to perform a plurality of operations, including receiving a first power limit signal for the wind turbine power system from an external controller, receiving a second power limit signal for the wind turbine power system, determining a constrained power limit signal based on the first and second power limit signals, applying a first frequency droop function to the constrained power limit signal, determining a power reference signal for the wind turbine power system as a function of an output of the first frequency droop function and the constrained power limit signal, adjusting the power reference signal using a second frequency droop function, determining one or more control commands for the wind turbine power system based on the adjusted power reference signal, and controlling the wind turbine power system based on the one or more control commands so as to support a grid frequency of the electrical grid within power available at the wind turbine power system. It should be understood that the system may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
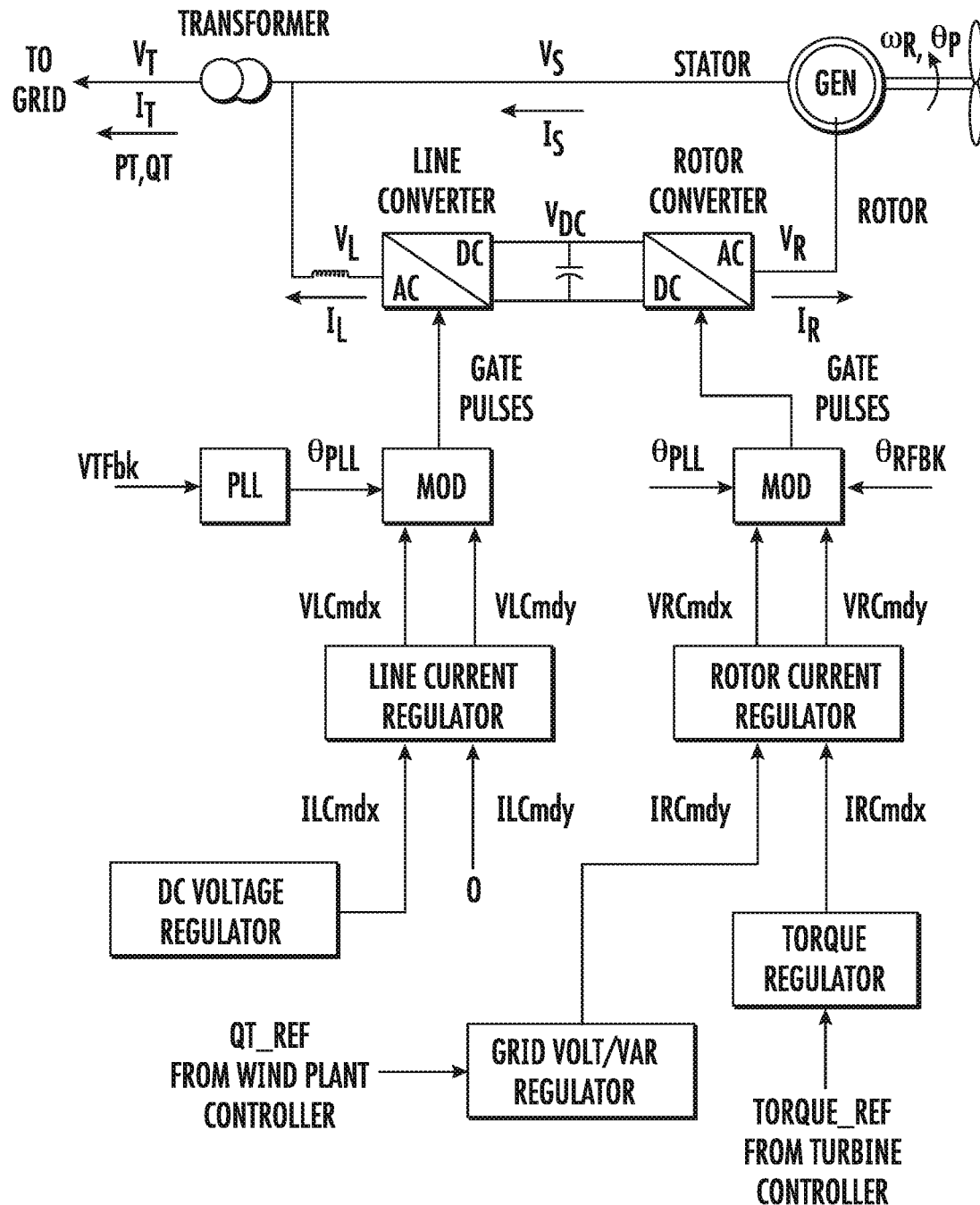
FIG. 1 illustrates a one-line diagram of a doubly-fed wind turbine generator with structure of converter controls for grid-following application according to conventional construction.
Figure 2:
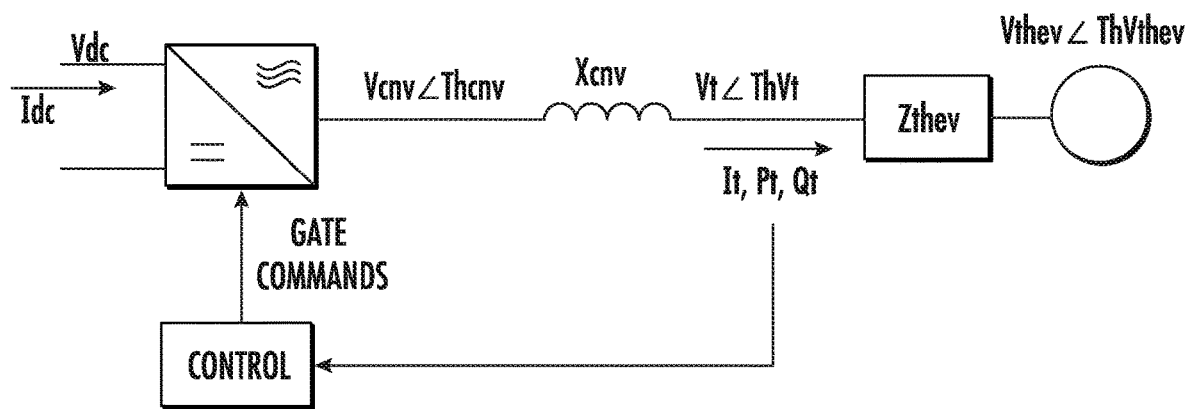
FIG. 2 illustrates a schematic diagram of one embodiment of a main circuit of a grid-forming system according to conventional construction.
Figure 3:
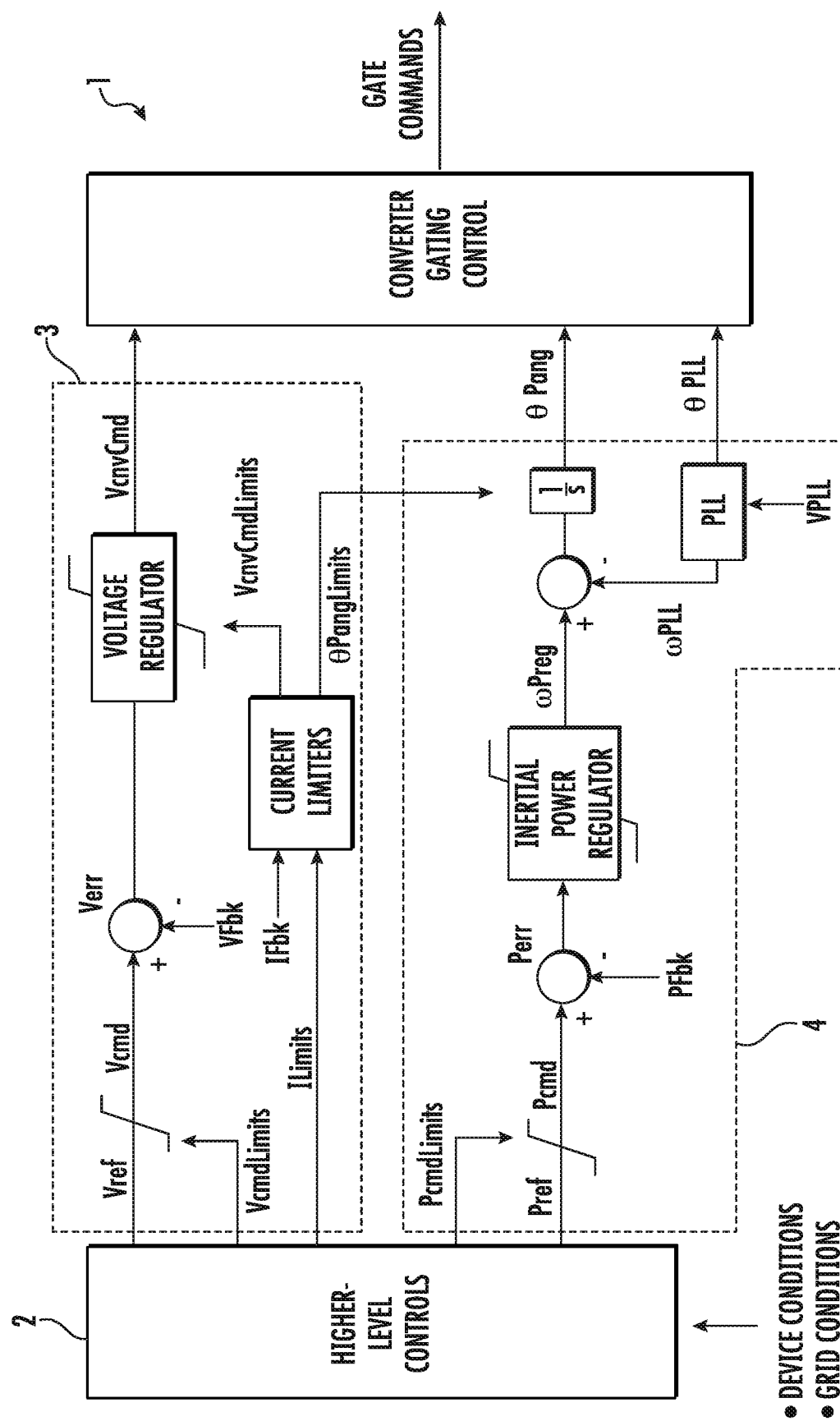
FIG. 3 illustrates a control diagram for providing grid-forming control according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Conventional thermal power generation plants utilize frequency droop control functions to share system active power loads among generators connected to the system and to support system frequency. Frequency droop control is characterized by changing active power generation in proportion to deviation in grid frequency in a direction that supports the grid frequency. Modern wind turbines based on grid-following converter technology do not utilize frequency droop for the purposes of sharing load with other generators, but rely on other generators (typically thermal power plants based on synchronous machines) to manage the variations in generation/load in the system. Thus, the wind turbines are generally allowed to inject the maximum power available from the local wind resource independent of system loads. Some exceptions to this behavior include larger (abnormal) frequency events, in which the wind turbine power output may be curtailed to mitigate any large imbalances in system generation/load.

Grid-forming converter technology responds to changes in system generation/load in a similar way as conventional (thermal) generation. Similar to conventional thermal generation, frequency droop is used in grid-forming converters to share loading among other parallel connected grid-forming resources. Unlike conventional power generation, however, the amount of power available from wind-turbines is less predictable due to variations in wind. The amount of support to system frequency in terms of active power is therefore constrained by local wind conditions. Thus, the present disclosure is directed systems and methods of power control of grid-forming inverter-based resources with frequency droop that are capable of supporting grid frequency while also respecting limitations in power availability from wind.

As used herein, inverter-based resources generally refer to electrical devices that can generate or absorb electric power through switching of power-electronic devices. Accordingly, inverter-based resource may include wind turbine generators, solar inverters, energy-storage systems, STATCOMs, or hydro-power systems. For example, in one embodiment, the inverter-based resource may be a wind turbine power system having a rotor-side converter, a line-side converter, and a doubly-fed induction generator (DFIG) connected to the electrical grid.

Figure 4:
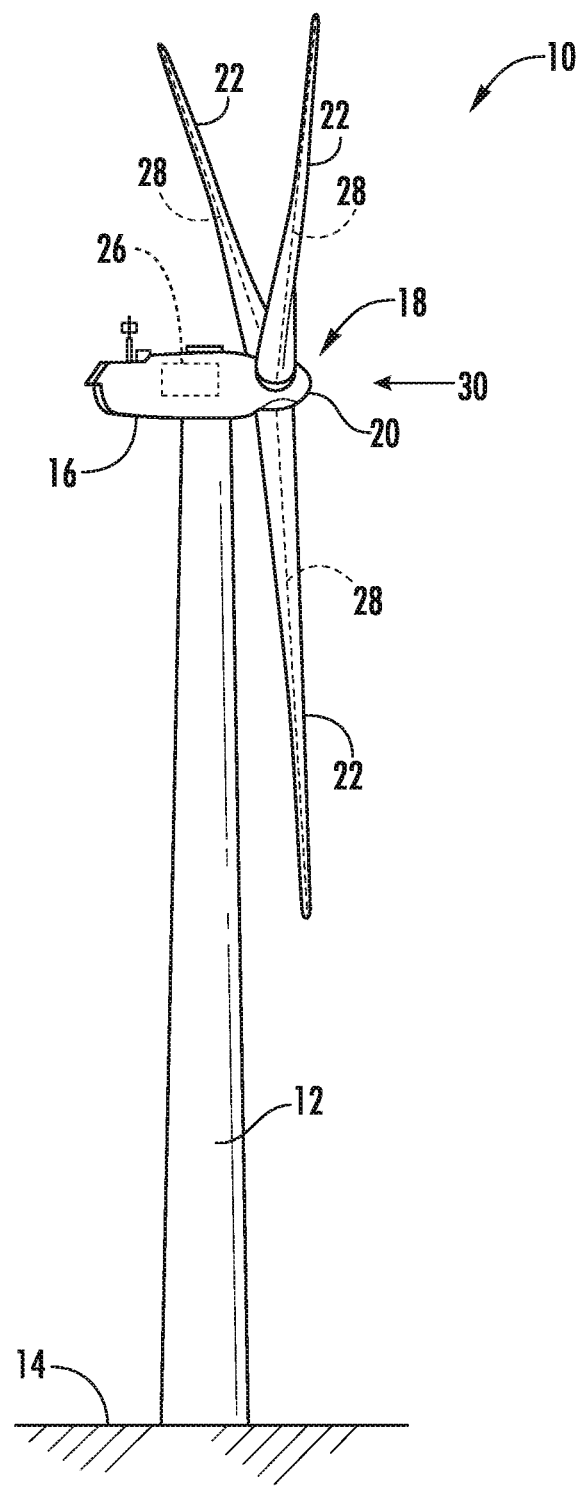
FIG. 4 illustrates a perspective view of one embodiment of a wind turbine according to the present disclosure.

Referring now to the drawings, FIG. 4 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 5) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 5:
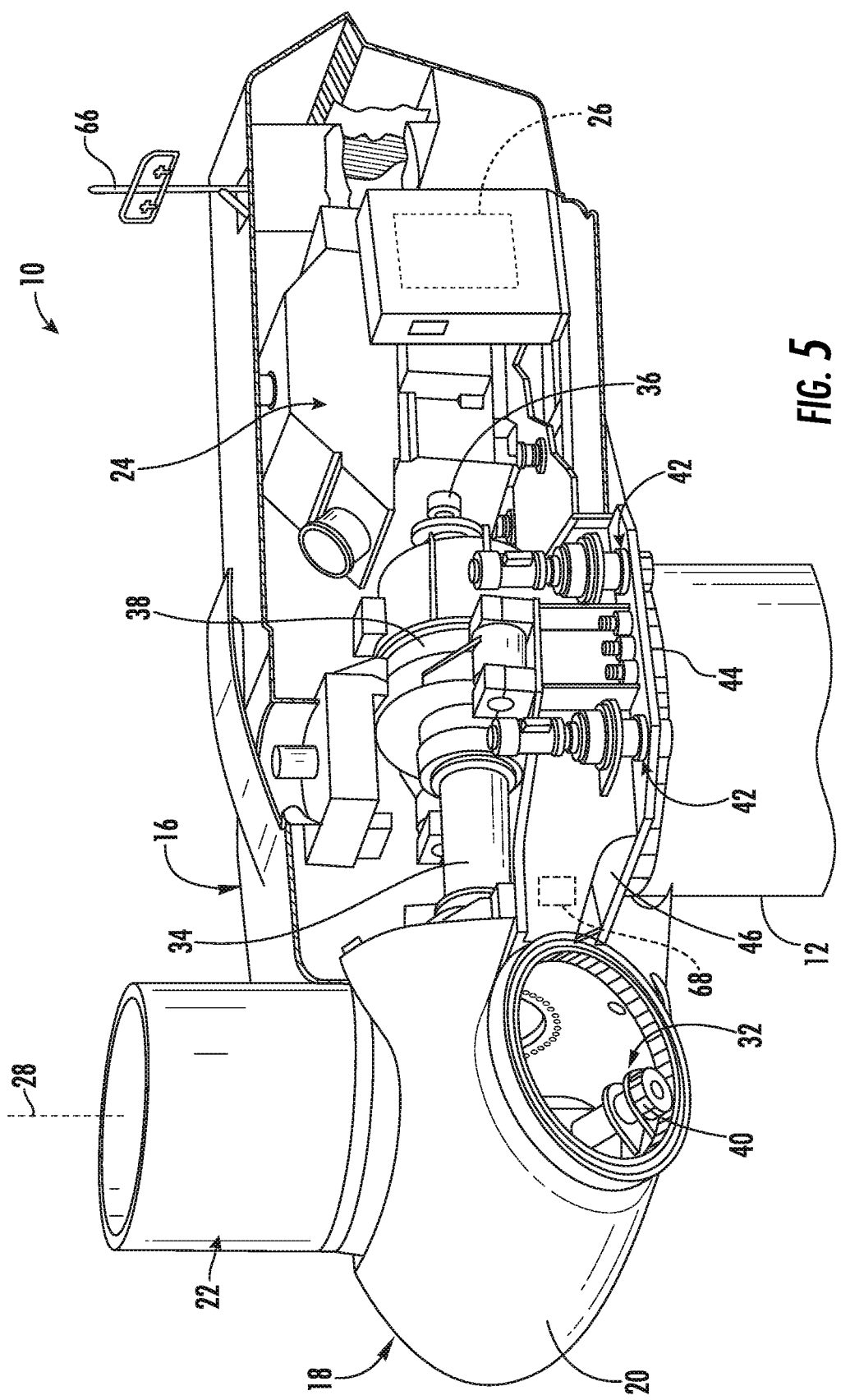
FIG. 5 illustrates a simplified, internal view of one embodiment of a nacelle according to the present disclosure.

Referring now to FIG. 5, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 6:
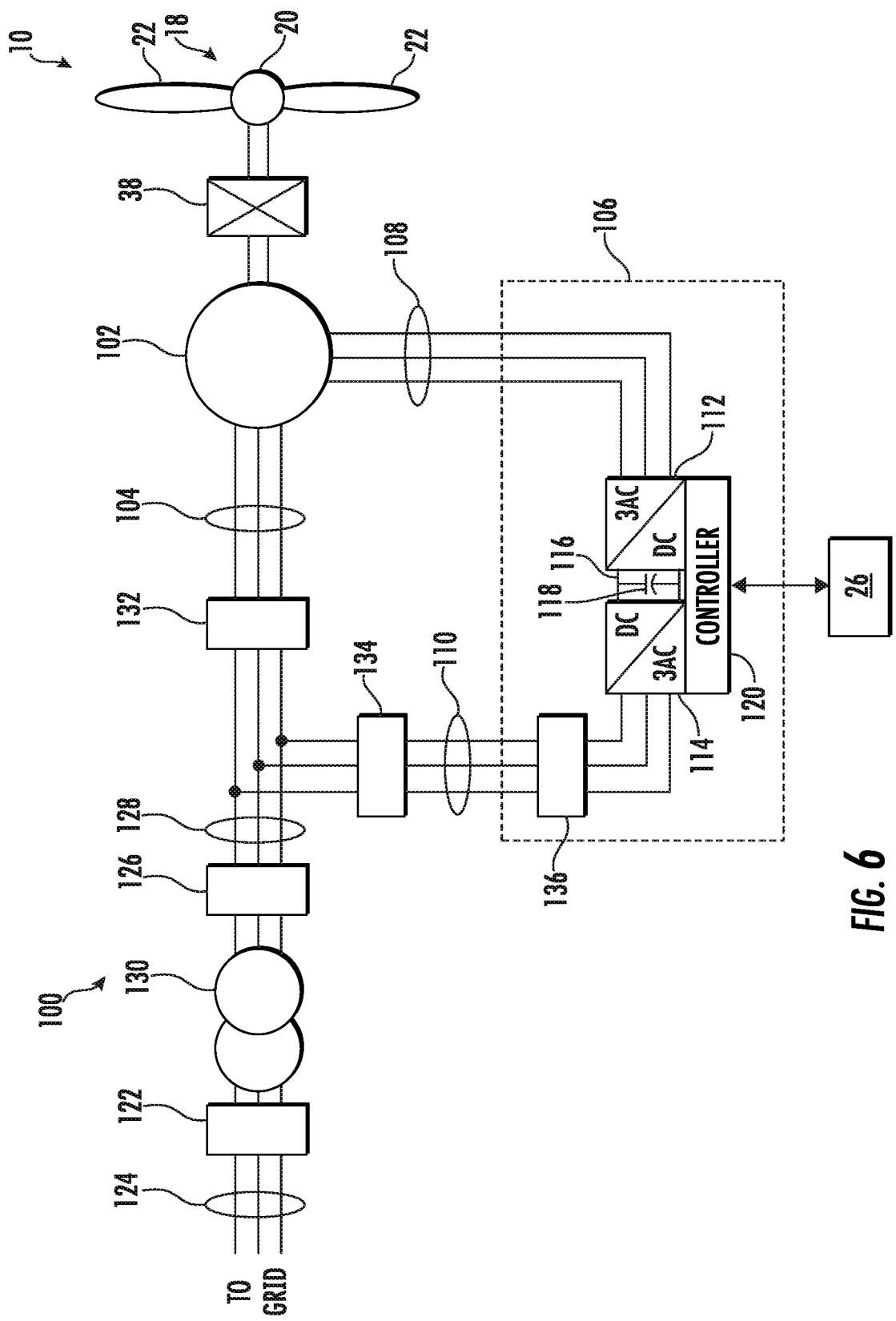
FIG. 6 illustrates a schematic view of one embodiment of a wind turbine electrical power system suitable for use with the wind turbine shown in FIG. 1.

Referring now to FIG. 6, a schematic diagram of one embodiment of a wind turbine power system 100 is illustrated in accordance with aspects of the present disclosure. Although the present disclosure will generally be described herein with reference to the wind turbine 10 shown in FIG. 4, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 6 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor-side converter (RSC) 112 and a line-side converter (LSC) 114. The DFIG 102 is coupled via the rotor bus 108 to the rotor-side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor-side converter 112 and/or the line-side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus 108, sinusoidal multi-phase (e.g., three-phase) alternating current (AC) power is provided to the power converter 106. The rotor-side converter 112 converts the AC power provided from the rotor bus 108 into direct current (DC) power and provides the DC power to the DC link 116. As is generally understood, switching elements (e.g., IGBTs) used in the bridge circuits of the rotor-side converter 112 may be modulated to convert the AC power provided from the rotor bus 108 into DC power suitable for the DC link 116.

In addition, the line-side converter 114 converts the DC power on the DC link 116 into AC output power suitable for the electrical grid 124. In particular, switching elements (e.g., IGBTs) used in bridge circuits of the line-side converter 114 can be modulated to convert the DC power on the DC link 116 into AC power on the line side bus 110. The AC power from the power converter 106 can be constrained with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 7:
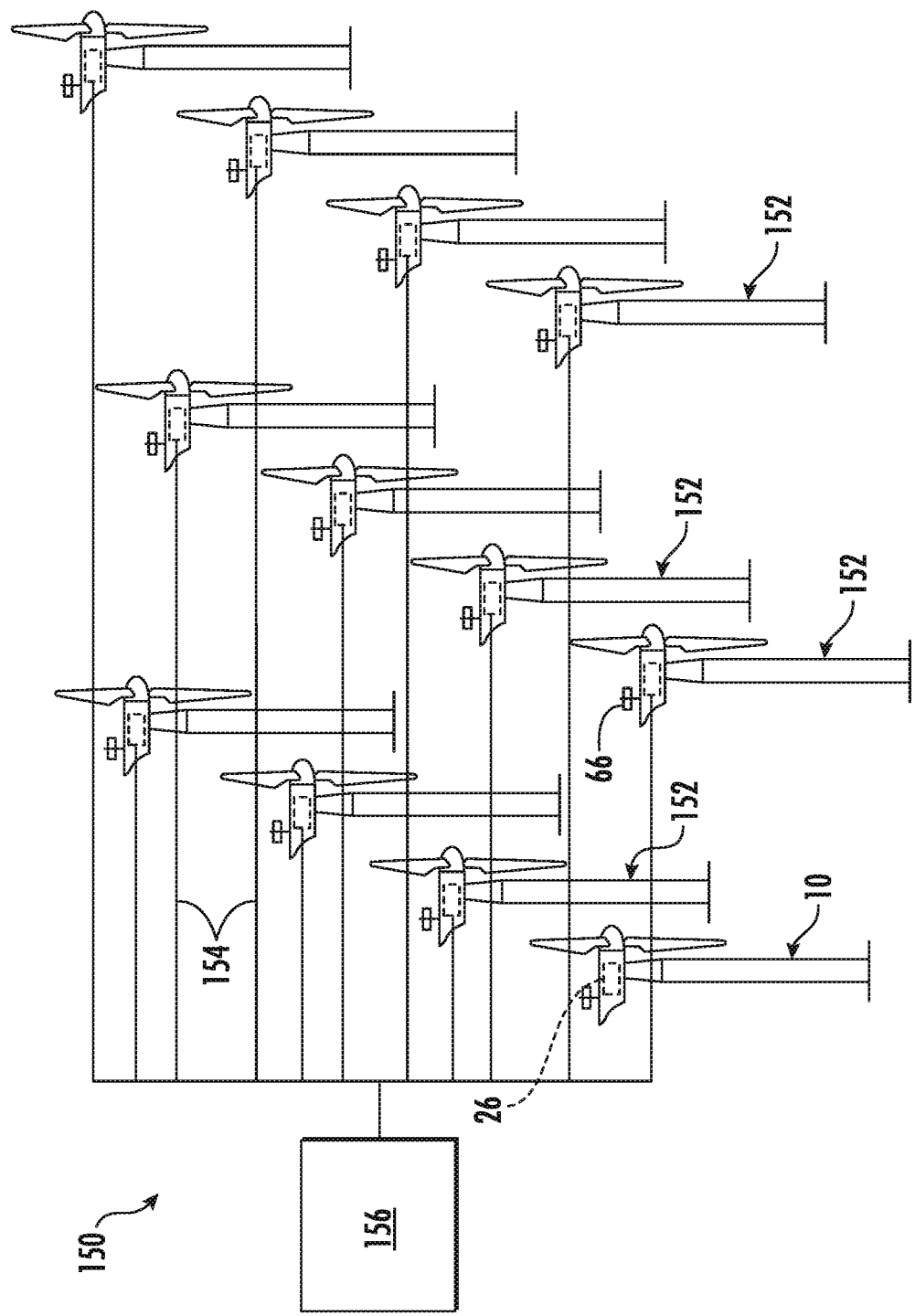
FIG. 7 illustrates a schematic view of one embodiment of a wind farm having a plurality of wind turbines according to the present disclosure.

Referring now to FIG. 7, the wind turbine power system 100 described herein may be part of a wind farm 50. As shown, the wind farm 50 may include a plurality of wind turbines 52, including the wind turbine 10 described above, and an overall farm-level controller 56. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the turbine controllers of the plurality of wind turbines 52 are communicatively coupled to the farm-level controller 56, e.g., through a wired connection, such as by connecting the turbine controller 26 through suitable communicative links 54 (e.g., a suitable cable). Alternatively, the turbine controllers may be communicatively coupled to the farm-level controller 56 through a wireless connection, such as by using any suitable wireless communications protocol known in the art. In further embodiments, the farm-level controller 56 is configured to send and receive control signals to and from the various wind turbines 52, such as for example, distributing real and/or reactive power demands across the wind turbines 52 of the wind farm 50.

Figure 8:
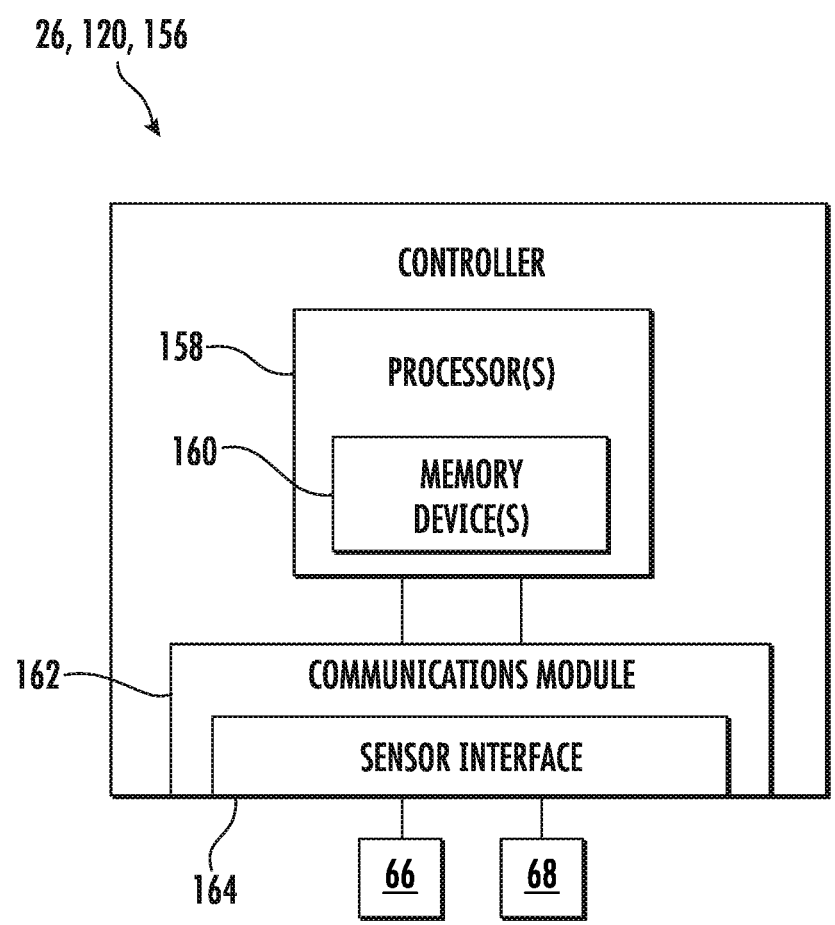
FIG. 8 illustrates a block diagram of one embodiment of a controller according to the present disclosure.

Referring now to FIG. 8, a block diagram of one embodiment of suitable components that may be included within the controller (such as any one of the converter controller 120, the turbine controller 26, and/or the farm-level controller 56 described herein) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations, and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

Figure 9:
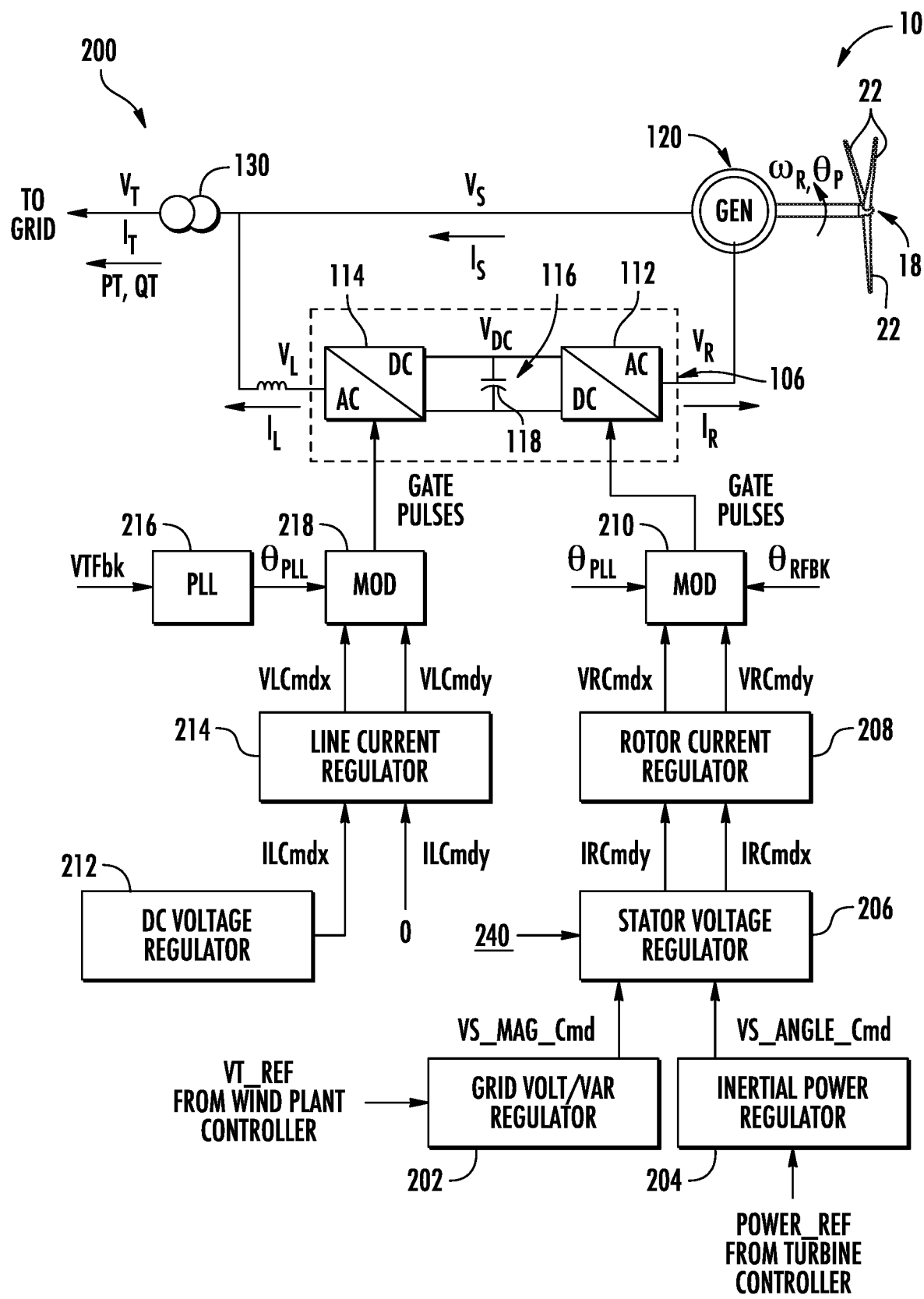
FIG. 9 illustrates a schematic diagram of one embodiment of a grid-forming converter for a double-fed wind turbine generator according to the present disclosure.

Referring now to FIG. 9, a system 200 for providing grid-forming control of a double-fed generator of a wind turbine according to the present disclosure is illustrated. In particular, FIG. 9 illustrates a schematic diagram of one embodiment of the system 200 according to the present disclosure, particularly illustrating a one-line diagram of the double-fed wind turbine generator 102 with a high-level control structure for grid-forming characteristics.

As shown, the system 200 may include many of the same features of FIG. 6 described herein, with components having the same reference characters representing like components. Further, as shown, the system 200 may include a control structure for controlling the line-side converter that is similar to the control structure shown in FIG. 1. More particularly, as shown, the line-side converter control structure may include a DC regulator 212 and a line current regulator 214. The DC regulator 212 is configured to generate line-side current commands for the line current regulator 214. The line current regulator 214 then generates line-side voltage commands for a modulator 218. The modulator 218 also receives an output (e.g., a phase-locked loop angle) from a phase-locked loop 216 to generate one or more gate pulses for the line-side converter 114. The phase-locked loop 216 typically generates its output using a voltage feedback signal.

Furthermore, as shown, the system 200 may also include a unique control structure for controlling the rotor-side converter 112 using grid-forming characteristics. In particular, as shown in FIG. 9, the system 200 may include a stator voltage regulator 206 for providing such grid-forming characteristics. In addition, as shown, the system 200 may include a grid voltage/VAR regulator 202, an inertial power regulator 204, a rotor current regulator 208, and a modulator 210.

More particularly, the system 200 includes an inner-loop current-regulator structure and a fast stator voltage regulator to convert voltage commands from the grid-forming controls to rotor current regulator commands. Thus, the system of the present disclosure provides control of the rotor voltage of the double-fed wind turbine generator 102 to meet a higher-level command for magnitude and angle of stator voltage. Such control must be relatively fast and insensitive to current flowing in the stator of the double-fed wind turbine generator 102.

Furthermore, in an embodiment, the inertial power regulator 204 of this system 200 implements various functions, including (1) following the active power reference supplied by the turbine control, and (2) sharing power among other parallel connected resources. Following the active power reference supplied by the turbine control is practically achieved through modification of the angle command to the stator voltage control, whereas sharing the power among other parallel connected resources is practically achieved through a frequency droop.

Figure 10:
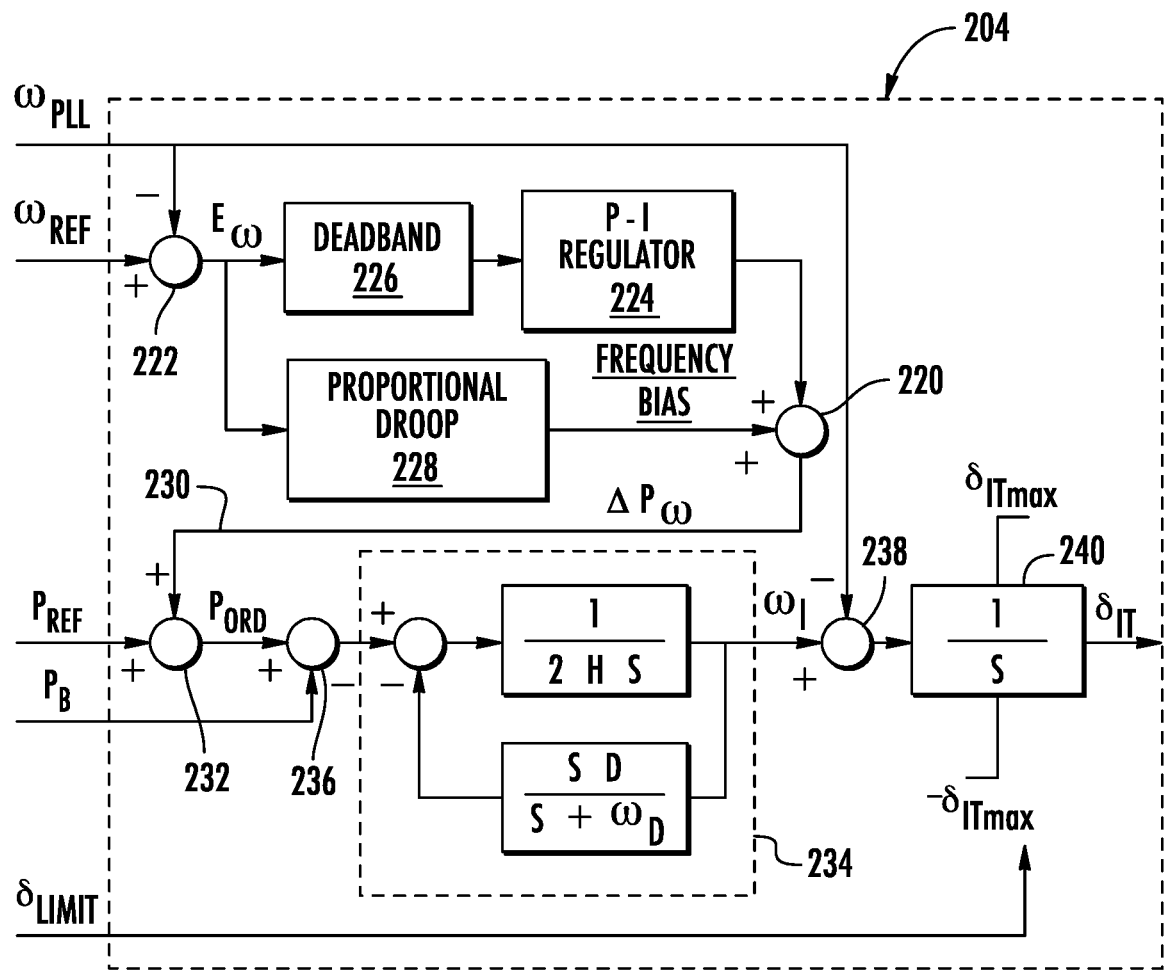
FIG. 10 illustrates a schematic diagram of one embodiment of an inertial power regulator with a frequency droop according to the present disclosure.

Referring now to FIG. 10, er$|terhih$epsgo$mekveq of the inertial power regulator 204 with frequency droop is provided. As shown, the frequency reference signal $\omega_{REF}$ and the phase lock loop frequency signal $\omega_{PLL}$ being constrained to generate the frequency error signal $E_\omega$. As can be seen, the $\omega_{PLL}$ signal, which represents the actual frequency of the inverter output is subtracted from the $\omega_{REF}$ signal in a summing junction 222 to generate the $E_\omega$ error signal. The $E_\omega$ error signal is provided to a frequency bias circuit having a first control loop including a conventional proportional plus integral regulator 224 and a deadband circuit 226. The deadband circuit 226 provides some range of variation of the frequency error signal, for example, approximately ½ Hz without any change of output signal. This limits response due to natural fluctuations of the power system frequency. The proportional plus integral regulator 224 converts the error signal to a conventional bias signal which is applied to a summing junction 220.

A second loop includes a proportional droop circuit 228 which may be an amplifier with a fixed gain that receives the $E_\omega$ error signal and provides an immediate compensation signal to the summing junction 220, the compensation signal being added to the output signal from the proportional plus integral regulator 224. The output of the summing junction 230 is a power offset signal which is coupled to a summing junction 232 whose other input is the power reference signal $P_{REF}$. Accordingly, the frequency offset signal from summing junction 220 serves to modify the power reference signal $P_{REF}$. The purpose of such modification is to adjust the power reference signal $P_{REF}$ as a function of frequency shifts. More particularly, the intent of the system is to attempt to hold the system output frequency constant so that if there is an error between the output frequency and the reference frequency, the power reference signal $P_{REF}$ is adjusted to compensate for the frequency error.

Thus, as shown, the proportional droop circuit 228 modifies the power reference $P_{REF}$ from the turbine control by adding a droop term (i.e., the output from 230) determined by the difference between the frequency reference and the actual frequency. Under normal conditions, the grid frequency is close to nominal and the droop term is zero. When there is an imbalance in generation and load, the grid frequency may deviate from nominal and the droop term will cause the power converter 106 to generate power different from the power reference $P_{REF}$ from the turbine control. The impact of this power deviation on the turbine control may be unintended changes in speed of the drivetrain, potentially leading to trips of the wind turbine 10.

Still referring to FIG. 10, the power regulator 204 also introduces an inertial regulator 234 which modifies the power error signal to simulate the inertia of synchronous machines. More particularly, the inertial regulator 204 prevents sudden frequency changes or power changes which can cause transient torques to be generated by the motors coupled to the inverter output if sudden changes in the inverter output are experienced. The inertial regulator 234 may include a conventional electronic circuit having the characteristics of a filtered differential element in that its output signal gradually increases in response to an increase in the input signal.

If the power reference signal is modified by the frequency bias circuit, the resultant signal identified as $P_{ORD}$ is developed at an output terminal of the summing junction 232 and applied to a summation circuit 236 where the commanded power or ordered power is compared to the measured output power $P_B$ of the system. Note here that the signal $P_B$ represents the real power developed at the output of the inverter. The output signal from the summation circuit 236 represents the power error signal which is applied to the inertial regulator 234. The signal developed by the inertial regulator as described above represents the desired frequency $\omega_1$ of the internal voltage $E_1$ and, if the frequency is properly tracking, will be the same as the frequency $\omega_{PLL}$. In this regard, the signal $\omega_1$ developed at the output of the inertial regulator 234 is summed in a summing junction 238 with the $\omega_{PLL}$ signal. Any difference between the phase lock loop frequency and the signal $\omega_1$ results in an error signal which is applied to a filtered differential element 240 to develop the $\delta_{IT}$ signal. In such embodiments, the filtered differential element 240 may be a conventional type of filtered differential element whose output signal $\delta_{IT}$ is an angle offset which can be summed with the output signal from the phase lock loop to generate the output signal $\theta_1$.

Figure 11:
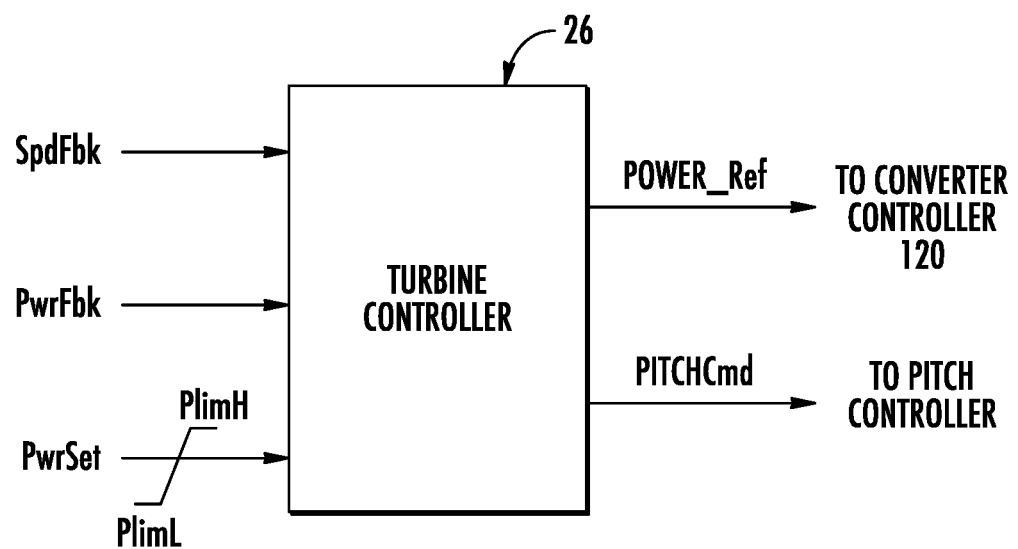
FIG. 11 illustrates a schematic diagram of one embodiment of the main inputs and outputs of a turbine controller of a wind turbine power system according to the present disclosure.

Referring now to FIG. 11, a simplified, block diagram of the main inputs and outputs of the turbine controller 26 is provided. In an embodiment, the primary objective of the turbine controller 26 is to maximize power generated by the generator 102 based on available power from the wind and within the power constraint imposed by the power setpoint limit PwrSet. Typically, the turbine controller 26 achieves this objective by regulating the speed and active power of the generator 102. Thus, the turbine controller 26 utilizes maximum power-point tracking algorithms to determine a power reference to the converter controller 120 and a pitch command to the pitch control to realize these control objectives.

Under normal grid conditions, the power setpoint (PwrSet) is set to nominal power rating of the generator 102. The turbine controller 26 adjusts pitch and converter power references to maximize the power output within the power setpoint. Therefore, actual power may deviate significantly from the setpoint based on wind conditions, but generally stays below the power setpoint. Under curtailed conditions, the power setpoint is reduced below nominal power rating, but the controls continue to operate the same way but are constrained to a lower power. Note that the power setpoint may also be interpreted as a power limit, as the controller is allowed to produce as much power as possible within this constraint.

The changes include three main elements: (1) a local constraint combined with the power setpoint limit to obtain a constrained power limit, (2) Frequency reference supplied to grid-forming converter (ωREF) based on the filtered grid frequency feedback, and (3) frequency droop (Pdrp) adjustment to the constrained power setpoint limit. The first frequency droop function adjusts the constrained power setpoint limit to support the grid frequency, like conventional droop control functions in other types of generators.

Thus, certain modifications to the turbine and converter controller 26 and methods of operating same are provided by the present disclosure. In particular, and referring now to FIGS. 12 and 13, a method 300 and system 400 for controlling an inverter-based resource having a grid-forming power converter connected to an electrical grid according to the present disclosure are provided.

Figure 12:
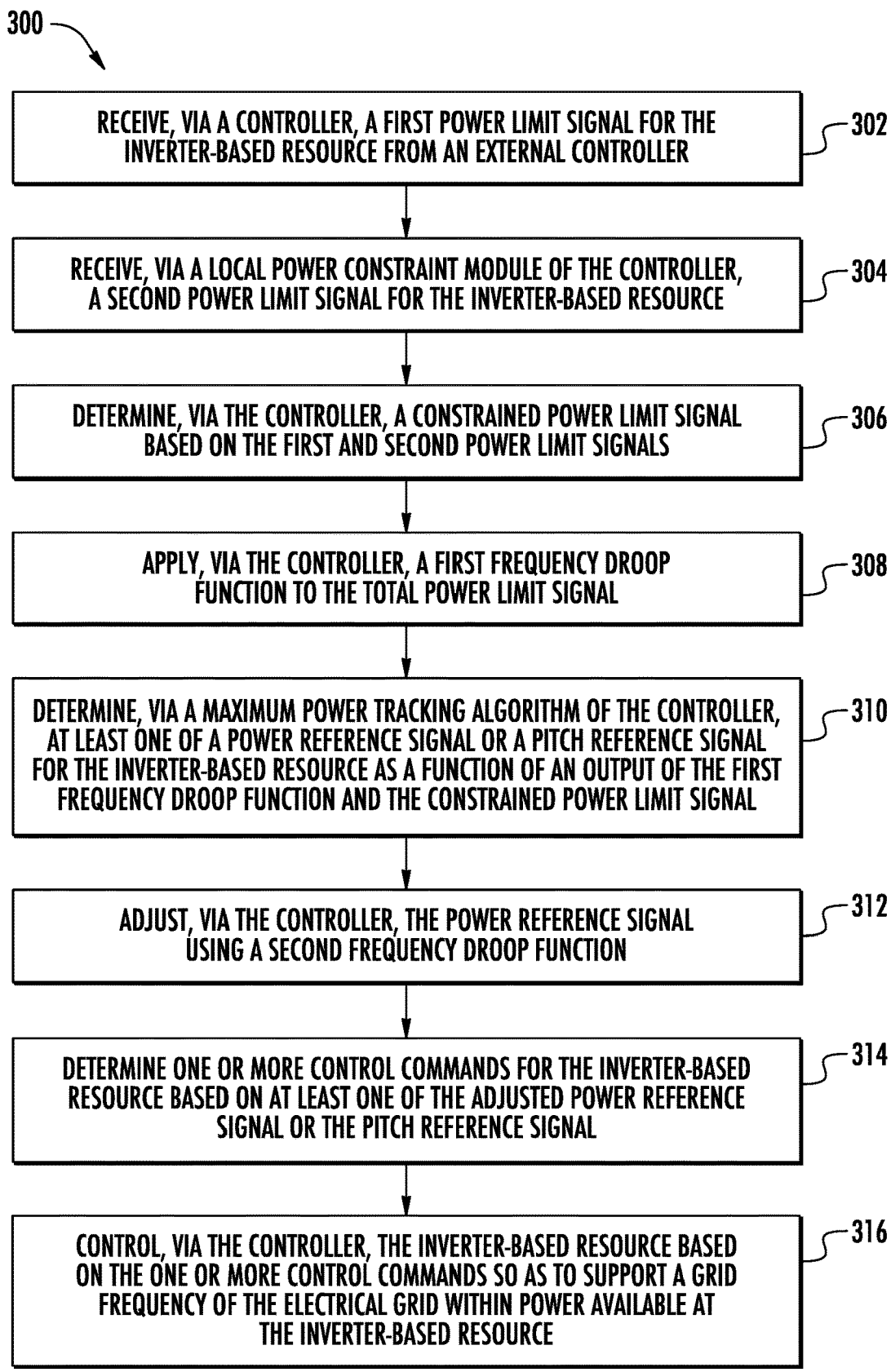
FIG. 12 illustrates a flow diagram of one embodiment of method for controlling a wind turbine power system having a power converter connected to an electrical grid according to the present disclosure.
Figure 13:
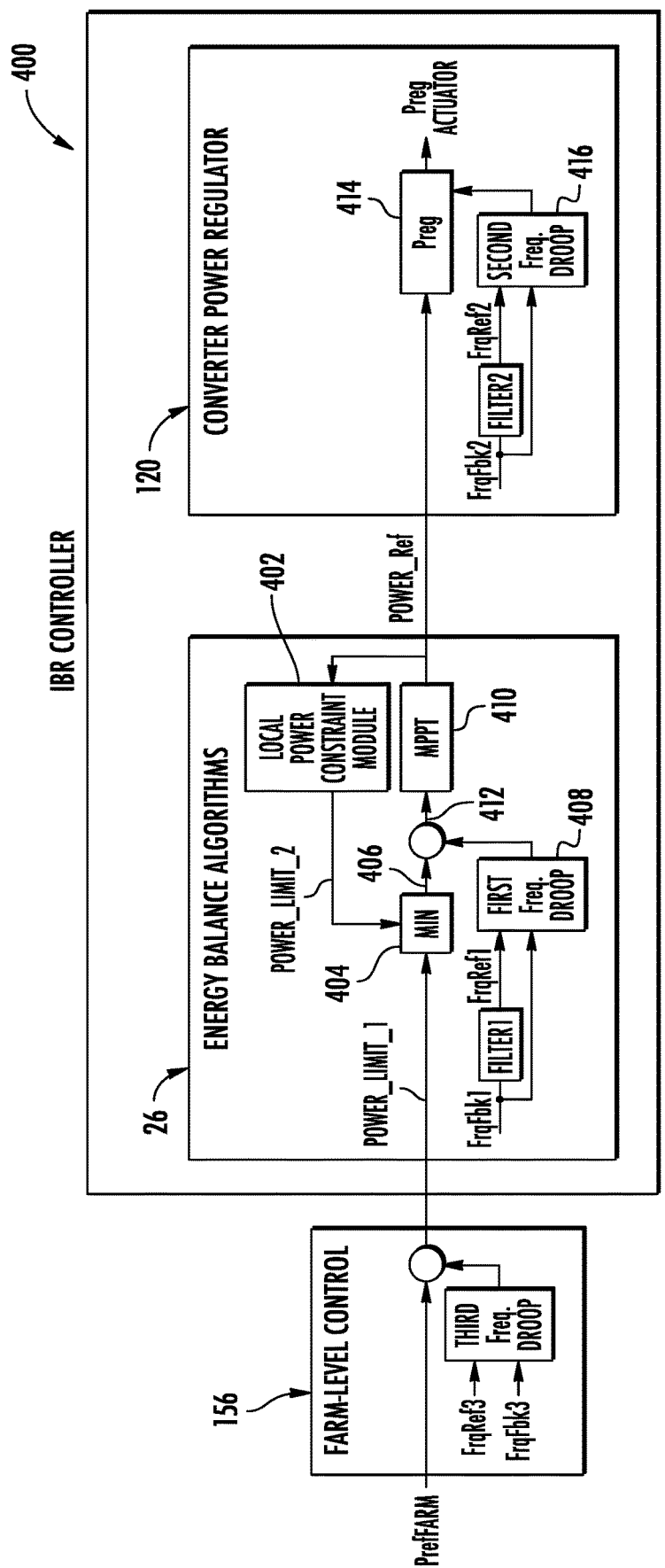
FIG. 13 illustrates a schematic diagram of one embodiment of a system for controlling a wind turbine power system having a power converter connected to an electrical grid according to the present disclosure.
Figure 14:
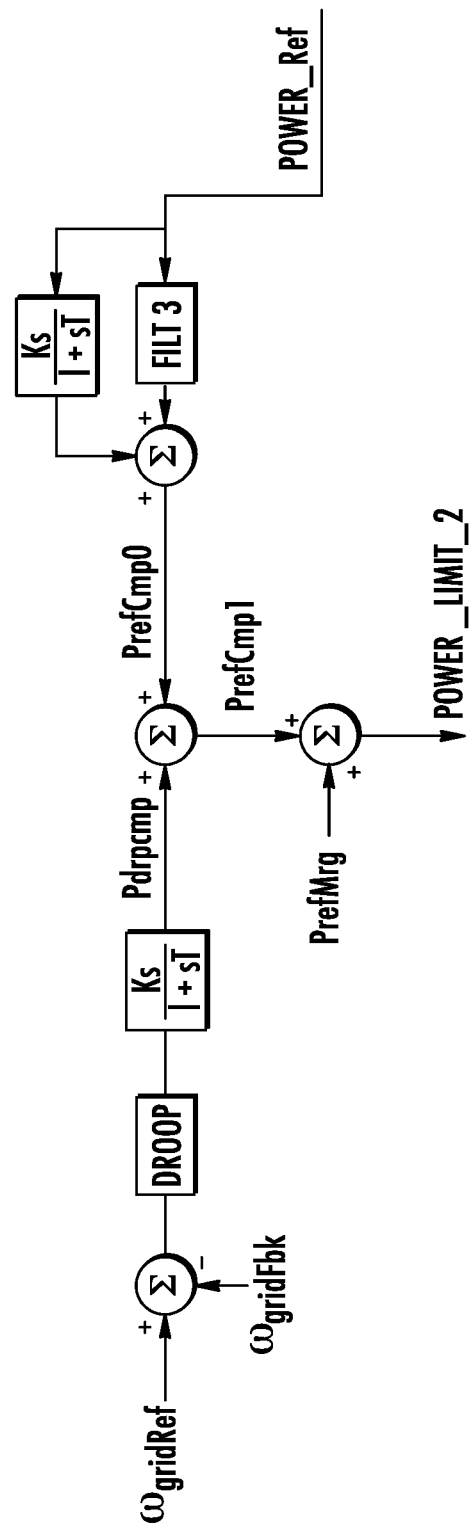
FIG. 14 illustrates a schematic diagram of one embodiment of a local power constraint module for a system for controlling a wind turbine power system having a power converter connected to an electrical grid according to the present disclosure.

Referring particularly to FIGS. 12-14, a flow diagram of one embodiment of a method 300 and schematic diagrams of a system 400 for controlling an inverter-based resource having a grid-forming power converter connected to an electrical grid according to the present disclosure are provided. Thus, the method 300 of the present disclosure can be better understood with reference to the system 400 illustrated in FIGS. 13 and 14, which illustrates the modifications to the inverter-based resource controller 26 for grid-forming applications. As mentioned, the modifications include, at least, (1) a local constraint combined with the power setpoint limit to obtain a constrained power limit, (2) Frequency reference supplied to grid-forming converter ($\omega_{REF}$) based on the filtered grid frequency feedback, and (3) frequency droop (Pdrp) adjustment to the constrained power setpoint limit.

Accordingly, in such embodiments, the frequency droop function adjusts the power setpoint limit to support the grid frequency, like conventional droop control functions in other types of generators. Moreover, as shown, the frequency reference supplied to the converter controller 120 is based on a filtered version of the grid frequency feedback. Thus, this newly supplied frequency reference is configured to drive the converter droop to zero during steady state, allowing the frequency droop in the turbine controller 26 to respond to the power demands from the electrical grid. In addition, the new constrained power limit follows closer to actual power being generated by the generator 102, thereby allowing the droop function to adjust power away from the present output based on the grid frequency.

Referring particularly to FIG. 12, in an embodiment, for example, the inverter-based resource may be a wind turbine power system having at least one power converter coupled to a generator. In general, the method 300 is described herein with reference to the wind turbine power system 100 of FIGS. 4-11. However, it should be appreciated that the disclosed method 300 may be implemented with any other suitable power generation systems having any other suitable configurations. Further, the method 300 may be implemented using the turbine controller 26, the converter controller 120, or any other suitable control device or combinations thereof. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, constrained, and/or adapted in various ways without deviating from the scope of the present disclosure.

As shown at (302), the method 300 includes receiving a first power limit signal for the inverter-based resource from an external controller. For example, as shown in FIG. 13, the turbine controller 26 receives the first power limit Power_Limit_1 from the farm-level controller 156. Referring back to FIG. 12, as shown at (304), the method 300 includes receiving, via a local power constraint module of the controller, a second power limit signal for the inverter-based resource. For example, as shown in FIG. 13, the turbine controller 26 may include a local power constraint module 402 that generates the second power limit Power_Limit_2 for the turbine controller 26.

Referring back to FIG. 12, as shown at (306), the method 300 includes determining, via the controller, a constrained power limit signal based on the first and second power limit signals. For example, as shown in FIG. 13, the minimum module 404 is configured to determine the constrained power limit signal 406 as a function of the first and second power limit signals.

Referring back to FIG. 12, as shown at (308), the method 300 includes applying, via the controller, a first frequency droop function to the constrained power limit signal 406. For example, as shown in FIG. 13, the turbine controller 26 may include the first frequency droop function 408 that can be applied to the constrained power limit signal 406. In such embodiments, the first frequency droop function 408 generally includes one or more parameter settings defining the amount of power change from deviation in grid frequency.

Referring back to FIG. 12, as shown at (310), the method 300 includes determining, via a maximum power tracking algorithm of the controller, at least one of a power reference signal or a pitch reference signal for the inverter-based resource as a function of an output of the first frequency droop function 408 and the constrained power limit signal 406. For example, as shown in FIG. 13, the turbine controller 26 may include the maximum power tracking algorithm 410 that can determine the power reference signal Power_ref for the converter controller 120 using the output 412 of the first frequency droop function 408 and the constrained power limit signal 406.

Referring back to FIG. 12, as shown at (312), the method 300 includes adjusting the power reference signal using a second frequency droop function 416. For example, as shown in FIG. 13, the converter controller 120 may include a power regulator module 414 that receives the power reference signal Power_ref and an output of the second frequency droop function 416 that can be used to adjust the power reference signal.

Moreover, as shown in FIG. 13, a frequency reference (e.g., FrqRef1, FrqRef1) for at least one of the first and second frequency droop functions 408, 416 may be a filtered version of a frequency feedback (e.g., FrqFbk1, FrqFbk2) of the inverter-based resource. Furthermore, in an embodiment, a filter bandwidth of the first frequency droop function 408 may be lower than a filter bandwidth of the second frequency droop function 416.

More specifically, as shown in FIG. 14, various components of the power regulator module 414 described herein are illustrated. As shown, the power regulator module 414 is configured to determine the second power limit signal Power_Limit_2 for the inverter-based resource by determining a compensation for the power reference signal Power_Ref to account for frequency droop operation and determining a compensated output power reference signal PrefCmp0 based on the power reference signal Power_Ref. In such embodiments, determining the compensation for the power reference signal Power_Ref to account for frequency droop operation may include receiving a frequency grid reference signal $\omega_{gridRef}$ and a frequency grid feedback signal $\omega_{gridFbk}$ from the electrical grid, determining a difference between the frequency grid reference signal $\omega_{gridRef}$ and the frequency grid feedback signal $\omega_{gridFbk}$ via summing junction, and applying a frequency droop function to the difference to determine the compensation for the power reference signal Pdrpcmp.

In another embodiment, as shown, determining the compensation for the power reference signal Pdrpcmp to account for frequency droop operation may also include compensating, via a first filtered differential element, an output of a frequency droop function. Further, in an embodiment, as shown, the compensated output power reference signal PrefCmp0 may be determined based on the power reference signal Power_Ref by filtering the power reference signal Power_Ref via one or more filters and compensating, via a second filtered differential element, the filtered power reference signal to determine the compensated output power reference signal PrefCmp0.

Thus, as shown at summing junction, the compensation for the power reference signal Pdrpcmp and the compensated output power reference signal PrefCmp0 may be summed together to determine a final compensated power reference PrefCmp1. Accordingly, as shown at summing junction, a margin offset PrefMrg may be added to the to the final compensated power reference PrefCmp1 to help prevent unintended limiting of the power setpoint PwrSet due to wind-speed changes. The output of summing junction is thus the second power limit, Power_Limit_2.

Referring back to FIG. 12, as shown at (314), the method 300 includes determining one or more control commands for the inverter-based resource based on at least one of the adjusted power reference signal or the pitch reference signal. For example, in an embodiment, as shown in FIG. 13, the control command(s) may include a power regulating signal (e.g., PregACTUATOR) for a converter controller 120 or a pitch command for a pitch system of the wind turbine power system 100. Thus, in such embodiments, the output 418 of the power regulator module 414 may correspond to the control command(s). Referring back to FIG. 12, as shown at (316), the method 300 includes controlling the inverter-based resource based on the one or more control commands so as to support a grid frequency of the electrical grid within power available at the inverter-based resource.

Further aspects of the invention are provided by the subject matter of the following clauses:

Clause 1. A method for controlling an inverter-based resource having a power converter connected to an electrical grid, the method comprising:

receiving, via a controller, a first power limit signal for the inverter-based resource from an external controller;

receiving, via a local power constraint module of the controller, a second power limit signal for the inverter-based resource;

determining, via the controller, a constrained power limit signal based on the first and second power limit signals;

applying, via the controller, a first frequency droop function to the constrained power limit signal;

determining, via a maximum power tracking algorithm of the controller, at least one of a power reference signal or a pitch reference signal for the inverter-based resource as a function of an output of the first frequency droop function and the constrained power limit signal;

determining, via the controller, one or more control commands for the inverter-based resource based on at least one of the power reference signal or the pitch reference signal; and controlling, via the controller, the inverter-based resource based on the one or more control commands so as to support a grid frequency of the electrical grid within power available at the inverter-based resource.

Clause 2. The method of clause 1, further comprising adjusting, via the controller, the power reference signal using a second frequency droop function before determining the one or more control commands.

Clause 3. The method of clause 2, wherein a frequency reference for at least one of the first and second frequency droop functions is a filtered version of a frequency feedback of the inverter-based resource.

Clause 4. The method of clause 3, wherein a filter bandwidth of the first frequency droop function is higher than a filter bandwidth of the second frequency droop function.

Clause 5. The method of any of the preceding clauses, wherein the inverter-based resource comprises a wind turbine power system having at least one generator.

Clause 6. The method of clause 5, wherein the one or more control commands comprise at least one of a power signal for a converter controller of the power converter or a pitch command for a pitch system of the wind turbine power system.

Clause 7. The method of clause 6, wherein the controller comprises at least one of a turbine controller or a converter controller of the wind turbine power system.

Clause 8. The method of clause 6, further comprising determining, via the local power constraint module of the controller, the second power limit signal for the inverter-based resource by:

determining, via the controller, a compensation for the power reference signal to account for frequency droop operation;

determining, via the controller, a compensated output power reference signal based on the power reference signal; and determining a final compensated power reference based on the compensation for the power reference signal and the compensated output power reference signal.

Clause 9. The method of clause 8, wherein determining the compensation for the power reference signal to account for frequency droop operation further comprises:

receiving, via the controller, a frequency grid reference signal and a frequency grid feedback signal from the electrical grid;

determining a difference between the frequency grid reference signal and the frequency grid feedback signal; and applying, via the controller, a second frequency droop function to the difference to determine the compensation for the power reference signal.

Clause 10. The method of clause 9, wherein determining the compensation for the power reference signal to account for frequency droop operation further comprises:

compensating, via a first filtered differential element of the controller, an output of the second frequency droop function to determine the compensated output power reference signal.

Clause 11. The method of clauses 8-10, wherein determining the compensated output power reference signal based on the power reference signal further comprises:

filtering, via the controller, the power reference signal; and compensating, via a second filtered differential element of the controller, the filtered power reference signal to determine the compensated output power reference signal.

Clause 12. The method of clause 8, further comprising applying a margin offset to the final compensated power reference.

Clause 13. The method of any of the preceding clauses, further comprising:

generating, via the controller, a frequency reference signal based on the frequency grid feedback signal from the electrical grid; and sending, via the controller, the frequency reference signal to a converter controller of the power converter, wherein the frequency reference signal drives a converter droop to zero during steady state and the power setpoint limit constrains the power setpoint closer to actual power being generated by the inverter-based resource, thereby allowing the first frequency droop function to respond to power demands from the electrical grid.

Clause 14. The method of clause 13, wherein generating the frequency reference signal further comprises:

filtering, via one or more filters of the controller, the frequency grid feedback signal from the electrical grid.

Clause 15. The method of clause 14, wherein the one or more filters comprises at least one of a first-order low-pass filter or a rolling-average low-pass filter.

Clause 16. A system for controlling a wind turbine power system having a grid-forming power converter connected to an electrical grid, the system comprising:

a turbine controller comprising at least one processor, the at least one processor configured to perform a plurality of operations, the plurality of operations comprising:

receiving a first power limit signal for the wind turbine power system from an external controller;

receiving a second power limit signal for the wind turbine power system;

determining a constrained power limit signal based on the first and second power limit signals;

applying a first frequency droop function to the constrained power limit signal;

determining a power reference signal for the wind turbine power system as a function of an output of the first frequency droop function and the constrained power limit signal;

adjusting the power reference signal using a second frequency droop function;

determining one or more control commands for the inverter-based resource based on the adjusted power reference signal; and controlling the wind turbine power system based on the one or more control commands so as to support a grid frequency of the electrical grid within power available at the wind turbine power system.

Clause 17. The system of clause 16, wherein a frequency reference for at least one of the first and second frequency droop functions is a filtered version of a frequency feedback of the inverter-based resource.

Clause 18. The system of clauses 16-17, wherein a filter bandwidth of the first frequency droop function is higher than a filter bandwidth of the second frequency droop function.

Clause 19. The system of clause 18, wherein the one or more control commands comprise at least one of a power signal for a converter controller of the power converter or a pitch command for a pitch system of the wind turbine power system.

Clause 20. The system of clauses 18-19, further comprising determining the second power limit signal for the inverter-based resource by:

determining a compensation for the power reference signal to account for frequency droop operation;

determining a compensated output power reference signal based on the power reference signal; and determining a final compensated power reference based on the compensation for the power reference signal and the compensated output power reference signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an inverter-based resource having a power converter connected to an electrical grid, the method comprising:
    receiving, via a controller, a first power limit signal for the inverter-based resource from an external controller;
    receiving, via a local power constraint module of the controller, a second power limit signal for the inverter-based resource;
    determining, via the controller, a constrained power limit signal based on the first and second power limit signals;
    applying, via the controller, a first frequency droop function to the constrained power limit signal;
    determining, via a maximum power tracking algorithm of the controller, at least one of a power reference signal or a pitch reference signal for the inverter-based resource as a function of an output of the first frequency droop function and the constrained power limit signal;
    determining, via the controller, one or more control commands for the inverter-based resource based on at least one of the power reference signal or the pitch reference signal; and
    controlling, via the controller, the inverter-based resource based on the one or more control commands so as to support a grid frequency of the electrical grid within power available at the inverter-based resource.

2. The method of claim 1, further comprising adjusting, via the controller, the power reference signal using a second frequency droop function before determining the one or more control commands.

3. The method of claim 2, wherein a frequency reference for at least one of the first and second frequency droop functions is a filtered version of a frequency feedback of the inverter-based resource.

4. The method of claim 3, wherein a filter bandwidth of the first frequency droop function is higher than a filter bandwidth of the second frequency droop function.

5. The method of claim 1, wherein the inverter-based resource comprises a wind turbine power system having at least one generator.

6. The method of claim 5, wherein the one or more control commands comprise at least one of a power signal for a converter controller of the power converter or a pitch command for a pitch system of the wind turbine power system.

7. The method of claim 6, wherein the controller comprises at least one of a turbine controller or a converter controller of the wind turbine power system.

8. The method of claim 6, further comprising determining, via the local power constraint module of the controller, the second power limit signal for the inverter-based resource by:
    determining, via the controller, a compensation for the power reference signal to account for frequency droop operation;
    determining, via the controller, a compensated output power reference signal based on the power reference signal; and
    determining a final compensated power reference based on the compensation for the power reference signal and the compensated output power reference signal.

9. The method of claim 8, wherein determining the compensation for the power reference signal to account for frequency droop operation further comprises:
    receiving, via the controller, a frequency grid reference signal and a frequency grid feedback signal from the electrical grid;
    determining a difference between the frequency grid reference signal and the frequency grid feedback signal; and
    applying, via the controller, a second frequency droop function to the difference to determine the compensation for the power reference signal.

10. The method of claim 9, wherein determining the compensation for the power reference signal to account for frequency droop operation further comprises:
    compensating, via a first filtered differential element of the controller, an output of the second frequency droop function to determine the compensated output power reference signal.

11. The method of claim 9, further comprising:
    generating, via the controller, a frequency reference signal based on the frequency grid feedback signal from the electrical grid; and
    sending, via the controller, the frequency reference signal to a converter controller of the power converter,
    wherein the frequency reference signal drives a converter droop to zero during steady state and the power setpoint limit constrains the power setpoint closer to actual power being generated by the inverter-based resource, thereby allowing the first frequency droop function to respond to power demands from the electrical grid.

12. The method of claim 11, wherein generating the frequency reference signal further comprises:
    filtering, via one or more filters of the controller, the frequency grid feedback signal from the electrical grid.

13. The method of claim 12, wherein the one or more filters comprises at least one of a first-order low-pass filter or a rolling-average low-pass filter.

14. The method of claim 8, wherein determining the compensated output power reference signal based on the power reference signal further comprises:
    filtering, via the controller, the power reference signal; and
    compensating, via a second filtered differential element of the controller, the filtered power reference signal to determine the compensated output power reference signal.

15. The method of claim 8, further comprising applying a margin offset to the final compensated power reference.

16. A system for controlling a wind turbine power system having a grid-forming power converter connected to an electrical grid, the system comprising:
    a turbine controller comprising at least one processor, the at least one processor configured to perform a plurality of operations, the plurality of operations comprising:
        receiving a first power limit signal for the wind turbine power system from an external controller;

receiving a second power limit signal for the wind turbine power system;

determining a constrained power limit signal based on the first and second power limit signals;

applying a first frequency droop function to the constrained power limit signal;

determining a power reference signal for the wind turbine power system as a function of an output of the first frequency droop function and the constrained power limit signal;

adjusting the power reference signal using a second frequency droop function;

determining one or more control commands for the wind turbine power system based on the adjusted power reference signal; and controlling the wind turbine power system based on the one or more control commands so as to support a grid frequency of the electrical grid within power available at the wind turbine power system.

17. The system of claim 16, wherein a frequency reference for at least one of the first and second frequency droop functions is a filtered version of a frequency feedback of the wind turbine power system.

18. The system of claim 16, wherein a filter bandwidth of the first frequency droop function is higher than a filter bandwidth of the second frequency droop function.

19. The system of claim 18, wherein the one or more control commands comprise at least one of a power signal for a converter controller of the power converter or a pitch command for a pitch system of the wind turbine power system.

20. The system of claim 18, further comprising determining the second power limit signal for the wind turbine power system by:

determining a compensation for the power reference signal to account for frequency droop operation;

determining a compensated output power reference signal based on the power reference signal; and determining a final compensated power reference based on the compensation for the power reference signal and the compensated output power reference signal.

\* \* \* \* \*